UNITED STATES PATENT OFFICE.

OTTOKAR BOECKING, OF HAMBURG, GERMANY.

OIL-VARNISH AND PROCESS FOR MANUFACTURING SAME.

1,262,302.      Specification of Letters Patent.      Patented Apr. 9, 1918.

No Drawing.      Application filed July 6, 1914. Serial No. 849,337.

*To all whom it may concern:*

Be it known that I, OTTOKAR BOECKING, a subject of the German Emperor, and resident of Hamburg, Germany, have invented new and useful Improvements in Oil-Varnishes and Processes for Manufacturing Same, of which the following is a full, clear, and exact specification.

In the manufacture of oil varnishes or other masses such for example as linoleum masses with the help of copal resins and fatty oils, in particular drying oils, it is necessary to heat the copal resins to a high temperature before the addition of the oil. This so-called melting of the copals which in the first place are insoluble in oil, must be carried out with great care as otherwise, on mixing with the oil, a separation of solid masses, which is termed caking, takes place and gives rise to a product which is insoluble in the solvent and therefore useless.

In accordance with the present invention this melting can be avoided without producing caking so that a useful product can be obtained in a far simpler manner. This result is obtained by adding to the mass sulfur, sulfur compounds or compositions containing sulfur. In doing so, the sulfur can be used as such or in any chemical combination or solution which is soluble in the mixture of resin and oil, so that combination takes place. For example what are termed factis—a rubber substitute containing sulfur—have proved to be a suitable addition.

As an equivalent of sulfur, sulfur compounds or compositions containing sulfur, selenium, selenium compounds or compositions containing selenium may be used.

In employing such an addition, the copal resins can be mixed with the oils at ordinary temperatures and heating can be effected to the necessary temperature for obtaining the desired products without any insoluble substances being formed or remaining behind.

Example 1: 20 kilograms of Manila copal are heated with 20 kilograms of linseed oil to approximately 100 to 150° C. Approximately 200 g. of sulfur are then added. The mass is further heated to 300 to 320° C. A completely homogeneous mass is formed which after cooling, can be diluted with the necessary quantity of turpentine oil.

Example 2: 100 parts by weight of copal are mixed with 100 parts by weight of linseed oil and heated to approximately 100 to 150° C. 1 part by weight of ammonium sulfocyanate is then added and the mixture heated to about 300° C. until a completely homogeneous mass is formed. The mass can then be diluted after cooling in the ordinary manner and siccatives added if necessary.

Example 3: 100 parts by weight of copal are mixed with 100 parts by weight of linseed oil and heated to approximately 100 to 150° C. 5 parts by weight of factis are then added and the mixture heated to about 300° C. until a completely homogeneous mass is formed. The mass can then be diluted after cooling in the ordinary manner and siccatives added if necessary.

What I claim is:—

1. An oil varnish containing copal resin and fatty oil homogenized by a sulfur agent.

2. An oil varnish containing copal resin and fatty oil homogenized by sulfur.

3. The process of making varnishes consisting in subjecting copal resin, fatty oil and a homogenizing agent to the action of heat to form a varnish.

4. The process of making varnishes consisting in subjecting copal resin, fatty oil and a sulfur containing homogenizing agent to action of heat to incorporate the same, and then heating at an increased temperature to form a varnish.

5. The process of making varnishes consisting in subjecting copal resin, fatty oil and sulfur to the action of heat to incorporate the same, and then heating at an increased temperature to form a varnish.

6. The process of making varnishes consisting in subjecting about 20 parts of copal resin, about 20 parts of linseed oil to a temperature of 100 to 150° C. and while heating adding 2 parts of sulfur and then heating to 300 to 320° C. to form a varnish.

In testimony, that I claim the foregoing as my invention, I have signed my name in presence of two subscribing witnesses.

OTTOKAR BOECKING.

Witnesses:
     ERNEST H. L. MUMMENHOFF,
     CHARLES A. HALLEY, Jr.